Dec. 14, 1965 D. C. PILKINTON 3,223,786

SIGNALING CIRCUIT

Filed June 15, 1962 2 Sheets-Sheet 1

INVENTOR
D. C. PILKINTON
BY Donald M Duft
ATTORNEY

INVENTOR
D. C. PILKINTON
BY Donald M. Duft
ATTORNEY

United States Patent Office 3,223,786
Patented Dec. 14, 1965

3,223,786
SIGNALING CIRCUIT

Donald C. Pilkinton, Metuchen, N.J., assignor to Bell Telephone Laboratories, Incorporated, New York, N.Y., a corporation of New York Filed June 15, 1962, Ser. No. 202,751
8 Claims. (Cl. 179—18)

Figures 1, 3:
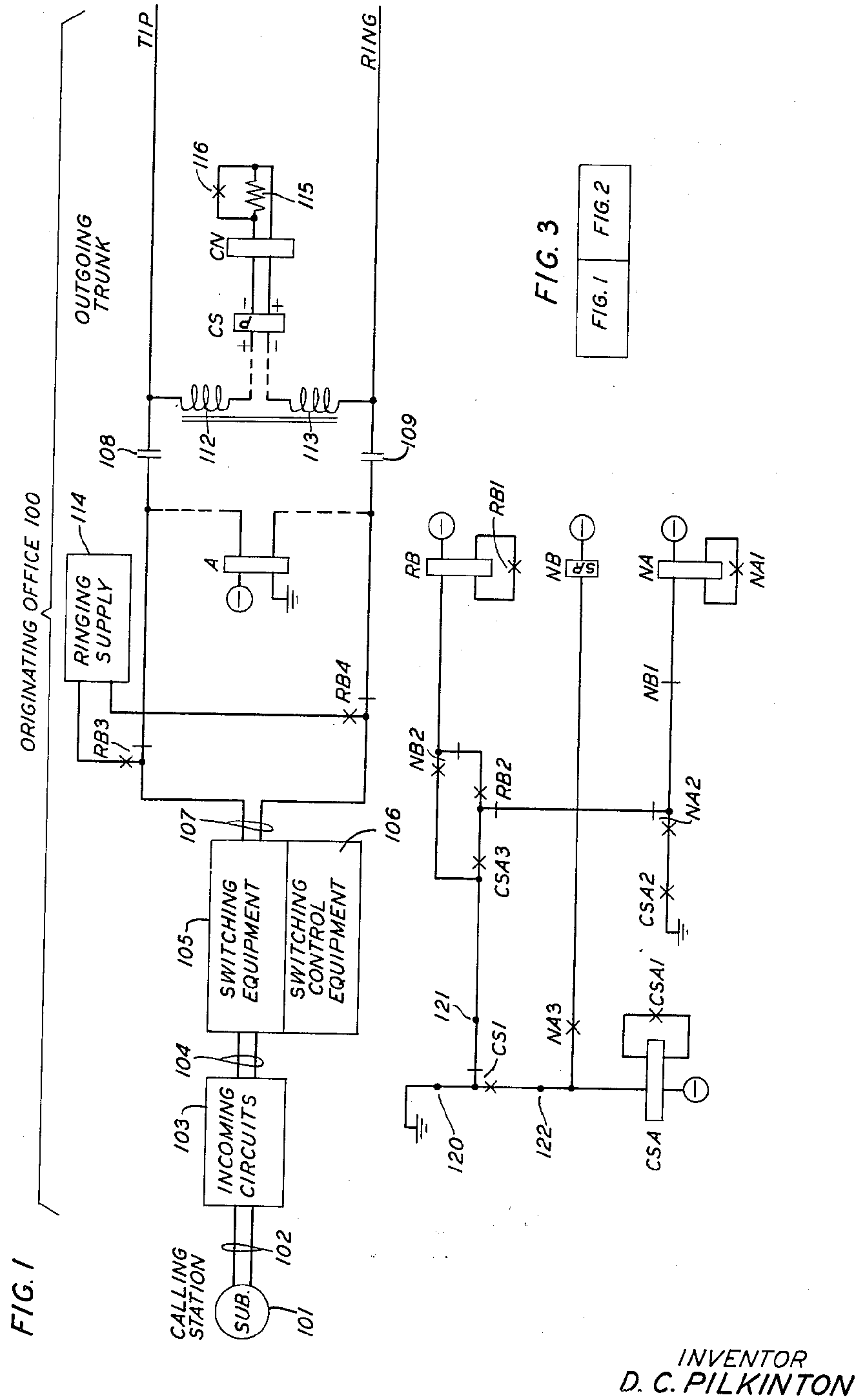

This invention relates to a signaling circuit and, more particularly, to a D.-C. signaling circuit which enables a circuit operation or equipment function to be controlled at a remote location. The invention more particularly relates to a signaling circuit which may be incorporated into an existing D.-C. signaling circuit with a minimum of modification to permit an additional type of control signal to be transmitted thereover while at the same time leaving unimpaired the present ability of the circuit to transmit other control signals.

It is a well-known expedient to transmit different types of signals over D.-C. signaling circuits for selectively controlling circuit functions or equipment operations at remote locations. Examples of such signals are loop closures, loop opens, loop reversals, momentary openings, simplex and phantom arrangements, and loop impedance variations. Any one or all of these may be utilized by a circuit to maximize its utility. Such factors as increased automation and the like often make it desirable to expand the number of types of control signals that may be transmitted over an existing circuit. If complexity and expense were no criteria, the signaling capabilities of a circuit could obviously be increased by the use of multifrequency signaling, pulse code modulation and other comparable sophisticated arrangements. Although such expedients may be advantageous in certain systems where the concomitant complexity and expense can be justified, there are a number of systems currently in use where such arrangements would be economically unacceptable.

Telephone switching systems represent an ideal field of application for the present invention since the provision of expanded direct-distance-dialing facilities requires an increase in the number of types of control signals which must be transmitted between switching control centers in such systems. This, in turn, makes it desirable to increase the number of types of control signals that can be transmitted over a single conductor pair.

It is therefore an object of the invention to provide an improved signaling circuit.

It is a further object of the invention to provide an improved D.-C. signaling circuit which may be incorporated into an existing signaling circuit for increasing the number of types of control signals that may be transmitted thereover without impairing any existing operational capabilities of the circuit.

In accordance with the present invention, the control or transmitting terminus of a D.-C. signaling circuit is provided with facilities for repeatedly reversing at a predetermined rate the potentials applied to a conductor pair extending to a remote or receiving terminus. Facilities are provided at the receiving terminus for detecting the polarity reversals and, in response thereto, for operating a control relay whose contacts may be arranged to effect a particular circuit action. The detection circuitry responds to only a continuing series of polarity reversals and therefore, does not respond to a single reversal in polarity which may comprise all or a portion of another control signal.

With the foregoing arrangement, a circuit operation at a remote location may be selectively controlled by energizing the polarity reversing circuitry at the transmitting terminus. This causes the aforementioned polarity reversals to be transmitted to the receiving terminus where they are detected and utilized to control a desired circuit operation or equipment function.

A feature of the present invention is the provision of a signaling circuit in which a continuing series of polarity reversals is utilized as a control signal.

A further feature of the invention is the provision of a D.-C. signaling circuit having at its receiving terminus polarity reversal detecting means for ascertaining the reception of a series of polarity reversals over a conductor pair extending to a transmitting terminus.

A further feature of the invention is the provision of a D.-C. signaling circuit having polarity reversal detection circuitry at its receiving terminus for detecting the appearance of polarity reversals on a pair of conductors extending to a transmitting terminus and, for the duration of time that such reversals continue, for controlling a circuit operation at the receiving terminus.

A further feature of the invention is the provision of a telephone signaling circuit in which a series of polarity reversals is utilized as a control signal by a distanct office to control a ringback operation or the like at an originating office.

Figure 2:
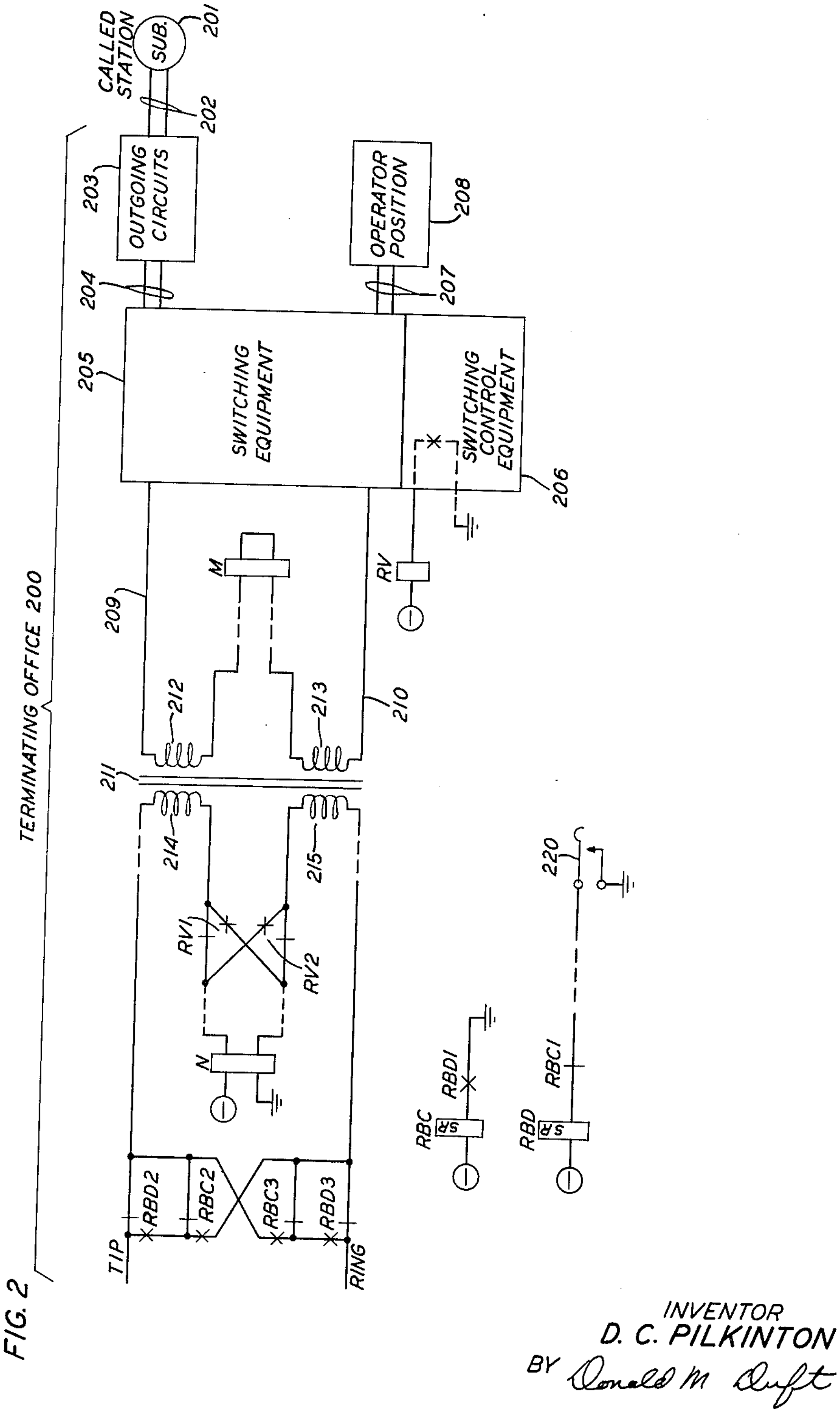

These and other objects and features of the invention will become apparent upon a reading of the following description of the invention taken in conjunction with the drawing, in which:

FIG. 1 discloses an exemplary embodiment of the polarity reversal detection circuitry associated with the receiving terminus in accordance with the present invention;

FIG. 2 discloses the circuitry associated with the transmitting terminus; while

FIG. 3 discloses the manner in which FIGS. 1 and 2 should be arranged with respect to each other.

Relay contacts are shown detached from their associated windings on the drawings. Contacts which are closed when a relay is operated (make contacts) are represented by an X crossing the lines representing the connecting conductors, while contacts which open when a relay is operated (break contacts) are represented by a short line intersecting the connecting conductors. The winding of each relay is designated by an alphabetical character, such as relay RA, for example, while the contacts associated with the relay are designated with the alphabetical designation of the controlling winding followed by a numerical designation individual to each contact, such as contacts RA1 and RA2, for example.

The present invention is shown on FIGS. 1 and 2 as comprising a portion of a telephone system in order that its over-all system concepts may be better understood. The details of the telephone system are shown for the most part in diagrammatic form since they comprise no portion of the present invention. FIG. 1 discloses an originating office together with the receiving portion of the applicant's signaling circuit while FIG. 2 discloses a terminating office together with the equipment thereat for applying a series of polarity reversals to the tip and ring conductors interconnecting the two offices. The polarity reversal detection circuitry on FIG. 1 is utilized to control ringback operations in the originating office. With this arrangement, ringing current is applied to a calling subscriber line whenever a series of polarity reversals is transmitted over the tip and ring conductors from the terminating office of FIG. 2 to the originating office of FIG. 1.

FIG. 1 discloses a calling station 101 interconnected by a conductor pair 102 with the incoming circuitry 103 of originating office 100. The incoming circuitry within the office, in turn, is interconnected over conductors 104 to switching equipment 105 which is controlled by switching control equipment 106. The output of the switching equipment is connected over conductors 107 to the outgoing trunk portion of the office. Conductors 107 are connected via break contacts RB3 and RB4 to the windings of relay A which supply talking battery to the incoming circuit whenever relay RB is released. Conductors 107 may also be connected over make contacts RB3 and RB4 to the output of the ringing supply 114 whenever relay RB is operated. Capacitors 108 and 109 interconnect signalwise the incoming circuitry with the tip and ring conductors of the outgoing trunk. The tip and ring conductors are connected through inductances 112 and 113 to a dry loop comprising the two windings of relays CS and CN together with resistor 115 in series.

The applicant's new and novel polarity reversal detection circuit comprises relays CS, RB, NA, NB and CSA on FIG. 1. The operation of this circuit together with its effect upon the operation of the local office is subsequently described. Relays CS and CN may comprise the facilities for receiving and detecting the other types of signals, as required, which may be transmitted from the office of FIG. 2 to that of FIG. 1. As already discussed, such signals may include single trunk reversals, momentary trunk openings, impedance variations, etc. The contacts of relays CS and CN and the circuitry associated with the detection of such signals is not shown on the present drawings since they comprise no part of the present invention.

The terminating or tandem office disclosed on FIG. 2 comprises the incoming trunk tip and ring conductors which are connected by means of windings 214 and 215 of transformer 211 and the windings of relay N to a talking battery. Transformer 211 also interconnects the incoming tip and ring conductors signalwise with its secondary windings 212 and 213 whose inner terminals are connected to a dry loop comprising the winding of relay M. The outer terminals of windings 212 and 213 are connected over conductors 209 and 210 to the switching equipment 205 which may be controlled by the switching control equipment 206. The switching equipment is connected over conductors 204 to the outgoing circuitry 203 of the office, which, in turn, is connected over conductors 202 to station 201. The office 200 also includes an operator position 208 which may be interconnected over conductors 207 with the switching equipment 205 for enabling an operator to serve any incoming calls requiring assistance.

Also disclosed on FIG. 2 are relays RBC and RBD which together with their contacts comprise the facilities for transmitting the polarity reversals back to the originating office in a manner subsequently described.

Let it be assumed that a subscriber at station 101 desires to call the subscriber at station 201. This being the case, the calling subscriber lifts his handset from its switchhook and dials the number of the station 201. The switching equipment 105 and switching control equipment 106 respond to the dialing operation in the customary manner to interconnect the calling station with the disclosed outgoing trunk circuit extending to the terminating office 200 serving called station 201. As a consequence of the interconnection of the calling line with the outgoing trunk circuit on FIG. 1, the switching control equipment may be arranged to operate contacts 116 in the outgoing trunk circuit. The operation of contacts 116 short circuits resistor 115 thereby decreasing the resistance of the dry loop shunting the tip and ring conductors. This decreased resistance increases the current through relay N in the incoming trunk circuit of the terminating office to operate it and thereby signify a seizure of the incoming trunk by the originating office. The equipment and circuitry associated with the operation of contacts 116 is not shown and need be considered no further since they comprise no portion of the present invention, since such details are not necessary for an understanding of the present invention, and since the details thereof would be entirely dependent upon the specific characteristics of the switching system shown for the most part in diagrammatic form on FIG. 1.

Once relay N has operated as a consequence of its seizure by the originating office, it may, by means whose details are not shown, effect the necessary circuit actions within switching equipment 205 and switching control equipment 206 to energize relay RV when the completion of the call has progressed to a certain state. The operation of relay RV opens its break contacts and closes its make contacts RV1 and RV2 in series with the windings of relay N to reverse the polarities applied to the trunk conductors. It may be seen that normally battery is applied through the upper winding of relay N, through break contacts RV1 and winding 214 to the trunk tip conductor. It also may be seen that normally ground potential is applied through the lower winding of relay N, break contacts RV2, winding 215 to the ring conductor of the trunk. Relay CS on FIG. 1 does not operate with battery on the tip conductor and ground on the ring conductor since this combination of polarities bucks the indicated polarities of the polarized relay and prevents its operation. However, the reversal of trunk polarities as relay RV operates applies ground to the tip conductor and negative battery to the ring conductor. These polarities are transmitted over the trunk through inductances 112 and 113 to operate polarized relay CS since this combination of polarities aids the indicated magnetization of the relay. The operation of relay CS may, in a manner well known in the telephony art, cause the switching equipment and switching control equipment on FIG. 1 to transmit signals over the trunk to office 200 where the switching and switching control equipment thereat will respond thereto to interconnect the incoming trunk signalwise with the called line 202 serving the called station 201.

The call dialed by the subscriber at station 101 may often be successfully completed to the subscriber at station 201 and therefore, insofar as the system arrangement shown in FIGS. 1 and 2 is concerned, my new and novel polarity reversal transmission and detection circuit will not be utilized. However, there also may be certain calls for which operator assistance is required for the successful completion thereof, such as, for example, on person-to-person calls to ascertain the availability of the designated called party, on collect calls, etc. On these, the switching equipment and the control equipment therefor at the terminating office will not initially exend the call directly to the called station 201 but instead will direct the call over conductors 207 to an operator at position 208. The operator will then ascertain from the calling subscriber the nature of the service she is to render in order to complete the call. There may be occasions when it may be preferable to have the calling subscriber hang up while the operator performs her services and then, once she has established a connection to the desired called party, she may then rering the calling party. This procedure is preferable in cases where delays may be encountered and where it is not advisable to have the calling station wait in an off-hook condition while the call is being completed.

In order to describe the operation of the applicant's signaling circuit, let it now be assumed that a call from station 101 has been directed by terminating office 200 to the operator at position 208 for assistance in completing the connection to station 201. Let it also be assumed that the calling party has hung up rather than wait while the operator completes her duties. Let it further be assumed that the operator has progressed with the completion of her assistance to the point that she desires to rering the calling party. This being the case, the operator operates key 220 which extends a ground over its contacts through break contacts RBC1 to the winding of RBD to operate it. The operation of this relay closes its make contacts RBD1 to operate relay RBC. The operation of relay RBC, in turn, opens its break contacts RBC1 to interrupt the energizing circuit for relay RBD. Relay RBD does not release immediately since it is of the slow release type. Ultimately, however, it releases and opens its make contacts RBD1 to open the energizing circuit for relay RBC. Relay RBC is similarly of the slow release type and does not release immediately. After a predetermined time interval, relay RBC releases and recloses its break contacts RBC1 to reoperate relay RBD which, in turn, closes its make contacts RBD1 to reoperate relay RBC. The intermittent sequential operation and release of relays RBC1 and RBD1 continues for the duration of time that the operator maintains the key contacts 220 closed.

It has previously been explained how with relay RV operated, ground is applied to trunk conductor T through the lower winding of relay N, make contacts RV1, winding 214, and break contacts RBD2. Also, at this time, negative battery is applied to the ring conductor through the upper winding of relay N, make contacts RV2, winding 215 and break contacts RBD3. The four sets of make and break contacts RBD2, RBC2, RBC3 and RBD3 are effective to reverse the polarities applied to the tip and ring trunk conductors whenever both of relays RBC and RBD are operated and to restore the polarities to the original state when both relays are released. Thus, the first operation of both relays RBC and RBD, when contacts 220 are closed, transfers the tip conductor from winding 214 and connects it via make contacts RBD2 and RBC2 to winding 215. Similarly, the ring conductor is transferred from winding 215 and connected via make contacts RBD3 and RBC3 to winding 214. The subsequent release of both relays RBC and RBD transfer the tip and ring conductors back to windings 214 and 215 respectively.

In summary, so far, it may be seen that the closure of key contacts 220 causes the repeated sequential operation and release of both relays RBC and RBD as long as contacts 220 remain closed. This, in turn, produces a corresponding operation and release of their contacts RBC2, RBD2, RBC3 and RBD3 to transmit a series of polarity reversals back over the trunk to the originating office.

It has previously been described how polarized relay CS on FIG. 1 operated when ground is applied to the tip conductor and negative battery is applied to the ring conductor as a consequence of relay RV operating in the terminating office. It has also been pointed out that a call will always progress through office 200 to the point where relay RV operates before the call could be extended to an operator at position 208 for assistance. Consequently, relay CS will always be operated prior to the time key 220 is depressed by the operator to effect the ringback operation.

The operation of relay CS, as a consequence of the operation of relay RV in the terminating office, completes a path from ground on terminal 120, through make contacts CS1 to the winding of relay CSA to operate it. The first reversal of trunk polarity, as both relays RBC and RBD in the terminating office operate, applies battery to the tip conductor and ground to the ring conductor. This releases polarized relay CS since the polarities now applied thereto oppose the indicated conditions required for its operation. Relay CSA, however, is slow to release and remains operated. The release of relay CS opens its make contacts and closes its break contacts and extends the ground on terminal 120 through break contacts CS1, make contacts CSA3, break contacts RB2, NA2 and contacts NB1, to the winding of relay NA to operate it. The operation of relay NA closes its make contacts NA1, thereby shunting its lower winding to make the relay slow to release. The operation of relay NA also closes its make contacts NA2 to complete a holding path for itself to ground through make contacts CSA2.

Polarized relay CS reoperates as relays RBC and RBD subsequently release and restore the trunk polarity to its original condition. The reoperation of relay CS recloses its make contacts CS1 which extend the ground on terminal 120 through make contacts NA3 to the winding of relay NB to operate it. The operation of slow release relay NB opens its make contacts NB1 to release relay NA. Relay CS releases upon the next trunk reversal when both relays RBC and RBD reoperate. This second release of relay CS extends the ground on terminal 120 through its break contacts CS1, through make contacts NB2, to the winding of relay RB to operate it. Relay RB, in operating, transforms itself into a slow release relay by virtue of the closure of its make contacts RB1. Relay NB finally releases after contacts NA3 open. The release of relay NB closes its break contacts NB2 which extend a holding circuit for relay RB through make contacts RB2 and CSA3 to break contacts CS1. The release time of relay RB is sufficiently long so that the ground applied to terminal 121 during each release of relay CS maintains relay RB operated so long as the polarity reversals continue at the rate governed by the operate and release times of relays RBC and RBD. Similarly, the intermittent ground applied to terminal 122 upon each closure of make contacts CS1 during the transmission of the polarity reversals maintains slow release relay CSA operated. Thus, both relays CSA and RB remain operated as long as the polarity reversals are applied to the trunk.

The operation of relay RB opens its break contacts RB3 and RB4 and closes its similarly designated make contacts to transfer conductors 107 from the windings of the A relay to the output of the ringing supply 114. This causes ringing current to be transmitted from source 114 through the circuitry within the office 100 to the calling station 101, thereby energizing the ringer thereat to alert the calling subscriber. The operator at position 108 may, if desired, either hold key 220 operated to apply ringing continuously to the calling station or, alternatively, she may operate and release it in an intermittent manner to effect a corresponding intermittent ringing action at the calling station.

The operator releases contacts 220 when the calling subscriber answers the rering of his line. She may then take whatever action may be necessary as determined by the operational requirements of office 200 to interconnect the calling and called subscribers.

The release of contacts 220 releases relay RBD which opens its make contacts RBD1 to release RBC. The release of these two relays restores the tip and ring conductors to their former polarity with relay RV operated so that ground is applied to the tip conductor and negative battery to the ring conductor.

The termination of the polarity reversing action at the office 200 terminates the intermittent operation and release of polarized relay CS and causes it to remain operated. The termination of the sequential operation and release of relay CS releases relay RB. The release of this relay opens its make contacts RB3 and RB4 and recloses its correspondingly designated break contacts to transfer conductors 107 from the ringing supply 114 back to the capacitors 108 and 109 and the talking battery supplied by the windings of relay A. The transmission path is now completed and the two subscribers may converse.

From the foregoing, it may be seen that my new and novel signaling circuit enables an already existing D.-C. transmission path to be provided with an additional means of signaling that is economical and which in no way impairs the already existing capabilities of the circuit.

It is to be understood that the above-described arrangements are but illustrative of the application of the principles of the invention. Numerous other arrangements may be devised by those skilled in the art without departing from the spirit and scope of the invention. For example, my signaling circuit is shown as part of a ringback arrangement in a telephone system. This showing is merely illustrative and is only made to facilitate an understanding of how the invention could be advantageously used. It is to be understood that the invention is not limited in its scope to use with a telephone ringback circuit and that it may, if desired, be utilized to control whatever operations that may be desired in a D.-C. signaling system.

What is claimed is:

1. In a telephone switching system, an originating office, a calling line connected to said originating office, a distant office, a trunk interconnecting said offices, controllable means at said distant office operable for reversing the polarity of said trunk at a predetermined rate, a first relay at said originating office operated during each normal polarity condition and released during each reversed polarity condition of said trunk, a second relay at said originating office, means responsive to the first release of said first relay for operating said second relay, a third relay at said originating office, means responsive to the reoperation of said first relay while said second relay is operated as the polarity of said trunk is restored to its normal condition for operating said third relay, means for releasing said second relay upon the operation of said third relay, a fourth relay at said originating office, means responsive to the concurrent operation of said third relay and the second release of said first relay upon the next polarity reversal of said trunk for operating said fourth relay, and means responsive to the operation of said fourth relay for applying ringing current to said calling line, said last named means being effective for disconnecting said ringing current from said line upon the cessation of said polarity reversals.

2. In a telephone switching system, an originating office, a calling line connected to said originating office, a distant office, a trunk interconnecting said offices, controllable means at said distant office operable for reversing the polarity of said trunk at a predetermined rate, a first relay at said originating office operated during each normal polarity condition and released during each reversed polarity condition of said trunk, a second relay at said originating office, a first set of contacts on said first relay closable upon the first release thereof for completing a circuit to operate said second relay, a third relay at said originating office, contacts on said second relay, a second set of contacts on said first relay closable upon the subsequent reoperation thereof as the polarity of said trunk is restored to its normal condition for operating said third relay over a circuit including said contacts on said second relay, contacts upon said third relay and effective upon its operation for releasing said second relay, a fourth relay at said originating office, contacts on said third and first relays effective upon the second release of said first relay for completing a circuit to operate said fourth relay, and means responsive to the operation of said fourth relay for applying ringing current to said calling line.

3. In a telephone switching system, an originating office, a line connected to said originating office, a distant office, a trunk interconnecting said offices, controllable means at said distant office operable for reversing the polarity of said trunk at a predetermined rate, a first relay at said originating office operated during a normal polarity condition and released during a reversed polarity condition of said trunk, a second relay at said originating office, a first set of contacts on said first relay closable upon the first release thereof for completing a circuit to operate said second relay, a third relay at said originating office, contacts on said second relay, a second set of contacts on said first relay closable upon the subsequent reoperation thereof as the polarity of said trunk is restored to its normal condition for operating said third relay over a circuit including said contacts on said second relay, contacts effective upon the operation of said third relay for releasing said second relay, a fourth relay at said originating office, contacts on said third relay closable upon the operation thereof for preparing a circuit to operate said fourth relay, contacts effective upon the second release of said first relay in response to a polarity reversal of said trunk for completing a circuit to operate said fourth relay, and means responsive to the operation of said fourth relay for applying ringing current to said line, said last named means being responsive to the cessation of said polarity reversals for removing said ringing current from said line.

4. In a telephone switching system, an originating office, a calling line connected to said originating office, a distant office, a trunk interconnecting said offices, controllable means at said distant office operable for reversing the polarity of said trunk at a predetermined rate, a first relay at said originating office operated during a normal polarity condition and released during a reversed polarity condition of said trunk, a second relay at said originating office, contacts on said first relay closable upon the first release thereof for completing a circuit to operate said second relay, a third relay at said originating office, contacts on said first relay closable upon the subsequent reoperation thereof as the polarity of said trunk is restored to its normal condition for operating said third relay over a circuit including contacts on said second relay, contacts effective for releasing said second relay upon the operation of said third relay, a fourth relay at said originating office, contacts on said third relay closable upon the operation thereof for completing a circuit to operate said fourth relay upon the second release of said first relay in response to a polarity reversal of said trunk, and means responsive to the operation of said fourth relay for applying ringing current to said calling line, said last named means being effective upon the cessation of said reversals for removing said ringing current from said line.

5. In a circuit for detecting polarity reversals on a trunk extending to a remote control terminal having controllable means for reversing the polarity of said trunk at a predetermined rate, a first relay operated during a normal polarity condition and released during a reversed polarity condition of said trunk, a second relay, means responsive to the first release of said first relay for operating said second relay, a third relay, means responsive to the reoperation of said first relay when said second relay is operated for operating said third relay, means responsive to the operation of said third relay for releasing said second relay, a fourth relay, and means responsive to the operation of said third relay for operating said fourth relay upon the second release of said first relay.

6. In a circuit for detecting a series of polarity reversals applied to a conductor pair at a predetermined rate, a first relay operated during a normal polarity condition and released during a reversed polarity condition of said pair, a second relay, means responsive to the first release of said first relay for operating said second relay, a third relay, means responsive to the subsequent reoperation of said first relay while said second relay is operated for operating said third relay, means for releasing said second relay subsequent to the operation of said third relay, a fourth relay, and means responsive to the second release of said first relay while said third relay is operated for operating said fourth relay, and means for maintaining said fourth relay operated as long as said polarity reversals continue at said predetermined rate.

7. In a circuit for detecting a series of polarity reversals applied to a conductor pair at a predetermined rate, a first relay operated during a normal polarity condition and released during a reversed polarity condition of said pair, a second relay, means responsive to the first release of said first relay upon the first reversal of said polarity for operating said second relay, a third relay, means responsive to the first reoperation of said first relay as the polarity of said pair is restored to its normal condition for operating said third relay, means responsive to the operation of said third relay for releasing said second relay, a fourth relay, means responsive to the second release of said first relay upon the next reversal of said polarity for operating said fourth relay, means for maintaining said fourth relay and operated as long as said polarity reversals continue at said predetermined rate, said last named means being effective for releasing said fourth relay upon the termination of said polarity reversals.

8. In a circuit for detecting a series of polarity reversals applied to a conductor pair at a predetermined rate, a first relay operated during a normal polarity condition and released during a reversed polarity condition of said pair, a second relay, contacts on said first relay effective upon the first release thereof for operating said second relay, a third relay, contacts on said first relay effective upon the first reoperation thereof as the polarity of said pair is restored to its normal condition for operating said third relay over a circuit including contacts on said second relay, contacts responsive to the operation of said third relay for releasing said second relay, a fourth relay, contacts on said first and third relays effective upon the second release of said first relay when said polarity is again reversed for operating said fourth relay, and contacts on said third relay effective for maintaining said fourth relay operated as long as said polarity reversals continue at said predetermined rate.

References Cited by the Examiner

UNITED STATES PATENTS

| | | | |
|---|---|---|---|
| 1,393,502 | 10/1921 | Clausen | 179—18 |
| 2,321,412 | 6/1943 | Neiswinter | 179—18 |

ROBERT H. ROSE, *Primary Examiner.*

WALTER L. LYNDE, *Examiner.*